(12) United States Patent
Wuestefeld

(10) Patent No.: US 7,563,039 B2
(45) Date of Patent: Jul. 21, 2009

(54) APPARATUS FOR SECURING A DANGEROUS ZONE

(75) Inventor: Martin Wuestefeld, Sexau (DE)

(73) Assignee: Sick AG, Waldkirch (DE)

( * ) Notice: Subject to any disclaimer, the term of this patent is extended or adjusted under 35 U.S.C. 154(b) by 570 days.

(21) Appl. No.: 11/431,086

(22) Filed: May 8, 2006

(65) Prior Publication Data

US 2006/0257139 A1 Nov. 16, 2006

(30) Foreign Application Priority Data

May 12, 2005 (DE) ........................ 10 2005 021 955

(51) Int. Cl.
*G03B 17/00* (2006.01)
*G03B 41/00* (2006.01)
(52) U.S. Cl. ...................... 396/427; 396/322
(58) Field of Classification Search ................. 396/174, 396/322, 427; 348/135, 139, 143, 152, 153, 348/159; 356/400; 250/221; 340/552
See application file for complete search history.

(56) References Cited

U.S. PATENT DOCUMENTS 6,075,238 A * 6/2000 Fembok ....................... 250/221

FOREIGN PATENT DOCUMENTS

| DE | 199 38 639 A1 | 2/2001 |
|---|---|---|
| DE | 100 26 710 A1 | 6/2001 |
| DE | 100 26 305 A1 | 11/2001 |
| DE | 100 33 608 A1 | 7/2002 |
| EP | 1197935 A2 | 4/2002 |
| EP | 1 512 992 A1 | 3/2005 |
| WO | WO 2005/010840 A1 | 2/2005 |

* cited by examiner

*Primary Examiner*—Rodney E Fuller
(74) *Attorney, Agent, or Firm*—Townsend and Townsend and Crew, LLP

(57) ABSTRACT

Apparatus with an optical system for monitoring a protected field has at least two opposing optical units arranged so that the protected field is between them. Each optical unit includes a picture-taking unit and a processing and switching unit that is operatively connected with the picture-taking unit for generating a danger signal. A marking is applied to each optical unit, and each picture-taking unit is arranged so that the marking on an opposite side of the protected field can be viewed by the first-named picture-taking unit. A processing and switching unit includes a comparison unit for comparing a picture with a reference picture. Each optical unit further has at least one lighting unit for illuminating the oppositely positioned marking on the oppositely positioned optical unit. The picture-taking unit, the markings and the lighting units are arranged in mutual alignment and on a common housing.

20 Claims, 2 Drawing Sheets

APPARATUS FOR SECURING A DANGEROUS ZONE

RELATED APPLICATIONS

This application claims the priority of German application No. 102005021955.1 filed May 12, 2005, and the disclosure thereof is incorporated herein by reference.

BACKGROUND OF THE INVENTION

The present invention relates to securing a dangerous space or area, especially dangerous zones in the vicinity of automatically working machines.

Published German patent application DE 199 38 639 A1 discloses a system for securing a dangerous zone, especially one at an automatically working machine. The system employs first means for generating an optically monitored, virtual barrier, as well as second means for generating a switching signal to stop the machine when the barrier is breached. This system is characterized in that the first means employ a picture-taking unit as well as a defined target, the picture of which is taken by the picture-taking unit. The second means is a comparator which compares the taken picture with a characteristic value of a reference picture. In one embodiment, the first means also includes a light source for illuminating the target.

This system has significant disadvantages. The various components of this known system, such as the picture-taking unit and the defined target, are arranged independent of each other and must be separately aligned. For that, the independently defined target must be within the field of view of the picture-taking unit. Following the rough alignment of the picture-taking unit, in order to include the defined target, costly further alignment and processing is necessary. To take adequate pictures, the picture-taking unit further requires a large field of view. For this, the picture sensor requires a large, two-dimensional receiving surface.

This known system has the further disadvantage that it attains the required redundancy by duplicating the system to assure that the picture-taking unit and the defined target operate properly at all times to adequately protect the danger zone that is being monitored. This greatly increases the costs of such systems.

In addition, this known system cannot have a defined target in the area of the picture-taking unit and the light source. As a result, dead zones are formed in these areas which cannot be monitored and which therefore constitute unprotected portions of the danger zone.

SUMMARY OF THE INVENTION

It is an object of the present invention to provide an improved system for securing dangerous zones, particularly such zones at automatically operating machines, which are less costly and provide a higher degree of safety than prior art systems.

This is attained in accordance with the present invention with an optical system that monitors a protected field and has at least two oppositely positioned optical units, with the protected field arranged between the units. Each of the optical units includes at least one picture-taking unit. The optical units also include a processing and switching unit for stopping the machine when the protected field is breached. The picture-taking unit has within its field of view at least one marking on the opposite side of the protected field, and the processing and switching unit includes a comparison unit which compares the taken picture with a reference picture. Each optical unit has at least one lighting unit for illuminating the oppositely located marking. The picture-taking unit, the marking for the oppositely located optical unit, and the lighting unit are installed and mutually aligned in a common housing.

By integrating the picture taking unit, the markings and the lighting unit in one housing, and aligning these components within the housing, the components need not be further independently aligned during the installation of the system. For mounting the lighting unit, the picture taking unit and the markings, only one housing has to be installed. This greatly lessens the effort and expenditures for installing the system.

Several picture-taking units and several markings as well as several lighting units can be arranged in one housing. Two picture-taking units can for example be installed in the same housing with their fields of view offset by 90°. This permits the monitoring of several danger zones in different directions. The associated lighting units and markings are then also offset by 90°.

In one embodiment of the invention, the second optical unit is identical to the first optical unit and therefore has the same spatial housing shape and dimensions. Such identical dimensions permit the mounting of the second optical unit simply opposite to the first optical unit so that the two units are longitudinally reversed and face each other. The relative positioning of the optical units need not be exact. A rough alignment of the optical unit is sufficient so long as the markings of the first and second optical units, respectively, can be viewed by the picture-taking units of the second and first optical units, respectively. The optical units are positioned so that the associated picture-taking units have the oppositely located markings within their fields of view without requiring further alignments. The picture-taking unit then forwards the information concerning the taken picture, or the picture can be further processed. Changes in the markings can then be recognized by the picture-taking unit for subsequent processing.

In another embodiment, the lighting unit of the first optical unit is within the field of view of the picture-taking unit of the second optical unit. Conversely, the lighting unit of the second optical unit is arranged within the field of view of the picture taking unit of the first optical unit. This allows the lighting unit of the first optical unit to be directed at and to affect the picture-taking unit of the second optical unit, and vice versa. In this manner, the picture-taking unit can be acted upon by the oppositely located optical unit so that, for example, the picture-taking unit can be stimulated with the lighting unit.

The picture-taking unit of the first and second optical units, respectively, can be acted upon with the lighting unit of the second and first optical units, respectively, above and/or below a predetermined threshold sensitivity of the picture-taking unit. This permits a monitoring and/or checking of the operating parameters and the functioning of the picture-taking unit.

The optical system or the processing and switching unit preferably include means for learning and memorizing the encountered markings. With such means for learning the markings, the system becomes easier and simpler to start up. By learning the markings, they need not be exactly aligned. Following a rough alignment, the markings can be learned and memorized with the means for learning it. Such means include, for example, a pushbutton, a key switch and/or an input arrangement with a display for observing the input and for observing the results of the input.

Means for changing at least one operating parameter of the lighting unit are preferably provided. With a change in the lighting unit, the illumination of the markings can be advantageously changed, or the direct illumination of the picture-taking unit can be varied.

For example, the means for changing the operating parameters can cyclically activate the lighting unit. This permits one to cyclically test the functioning of the picture-taking unit. Such self-examination provides an enhanced safety feature of the instrument.

Depending on the application, the operating parameter can advantageously also be the light intensity of the lighting unit and/or the duration of a light pulse and/or the duration of the pause between the light pulses and/or the wave length of the light. By changing one or more of these operating parameters of the lighting unit, the illumination of the markings can be differentiated from the influence of light from other sources. This advantageously allows one to reduce or suppress interfering impulse degrading influences from such other light.

In another preferred embodiment, the processing and switching unit is arranged in a separate housing. This way the optical units and the processing and switching units are separately installed. This has the advantage that the optical units are small and easy to handle so that they can be used and mounted even where space is limited. The processing and switching unit can be installed at a location different from that of the optical units. Interfering electromagnetic influences are thereby reduced or entirely eliminated due to this spatial separation. The common processing and switching unit can also be connected to other optical elements to greatly enhance the flexibility of the monitoring system of the present invention.

The processing and switching unit can be employed for communications between the lighting unit and the associated picture-taking unit. For this, information channels connect the optical units with the processing and switching unit. In this manner, adjustment and/or use information can be directed via the information channels to the illumination units and/or to or from the picture-taking units.

The information channels are preferably information conductors, bus systems or wireless transmission systems. For use on relatively smaller machines, information conductors are particularly useful. For larger installations, or for systems distributed over considerable distances, bus systems and wireless transmission systems are preferred.

In an advantageous development of the present invention, the markings are applied over the entire side of the housing so that they cover the entire surface of that side of the housing. The generated field of protection is free of dead zones over the entire side of the housing. This arrangement is particularly useful for installing optical units in limited spaces.

Additional markings can advantageously be added in the form of modules which are attached to the housing. This allows adaptation of the system of the present invention to different-size protected fields without the need for replacing the entire system.

To adapt the housing to the markings, the latter is additionally preferably longitudinally changeable. This way, the protected field that extends along the housing can be reduced in size without the need for changing the entire system.

The markings have at least two different portions which are preferably defined by colored light and dark fields. Openings for the picture-taking unit and the lighting unit are preferably arranged inside the dark fields of the marking to integrate the picture-taking unit and the lighting unit with the marking so that the latter can be used over the entire side of the housing to thereby prevent the formation of dead zones. This embodiment is particularly advantageous for applications in which the optical unit must be installed in limited space.

The picture-taking units of the optical units have picture-taking surfaces of like dimensions so that pictures of varying sizes and/or of differently positioned markings can be taken on the picture-taking surface. The picture-taking unit does not require changes for differently sized protected fields. The present invention makes it possible to use the same picture-taking unit for markings that cover various-size surfaces. This reduces the number of alternatives that need to be accommodated as well as the additional production costs that would be incurred thereby.

In a special embodiment of the present invention, the optical unit includes an interference filter. Amongst others, additional interfering light influences can thereby be suppressed. Additionally, the sharpness of the picture can be less when making multi-color reproductions.

In another development of the present invention, the optical unit includes receiving optics for projecting a picture onto the picture-taking unit. The receiving optics permits one to dimensionally fit a relatively elongated, narrow picture of the markings to the dimensions of the picture-taking unit.

The optical unit preferably includes a diaphragm aperture. The aperture is arranged at the focal point of the receiving optics to enhance the focal depth and suppress the effects of potentially interfering, indirect light from outside the intended receiving angle.

The aperture is preferably made from a metallic material. This provides greater electromagnetic tolerance in the area of the receiving optics.

The picture-taking unit is arranged behind the aperture at a distance of between about 0.5-2 mm. This renders the optical unit very compact and saves space. This embodiment is particularly useful when the optical unit must be installed where the available space is limited.

DESCRIPTION OF THE PREFERRED EMBODIMENTS

Figure 1:
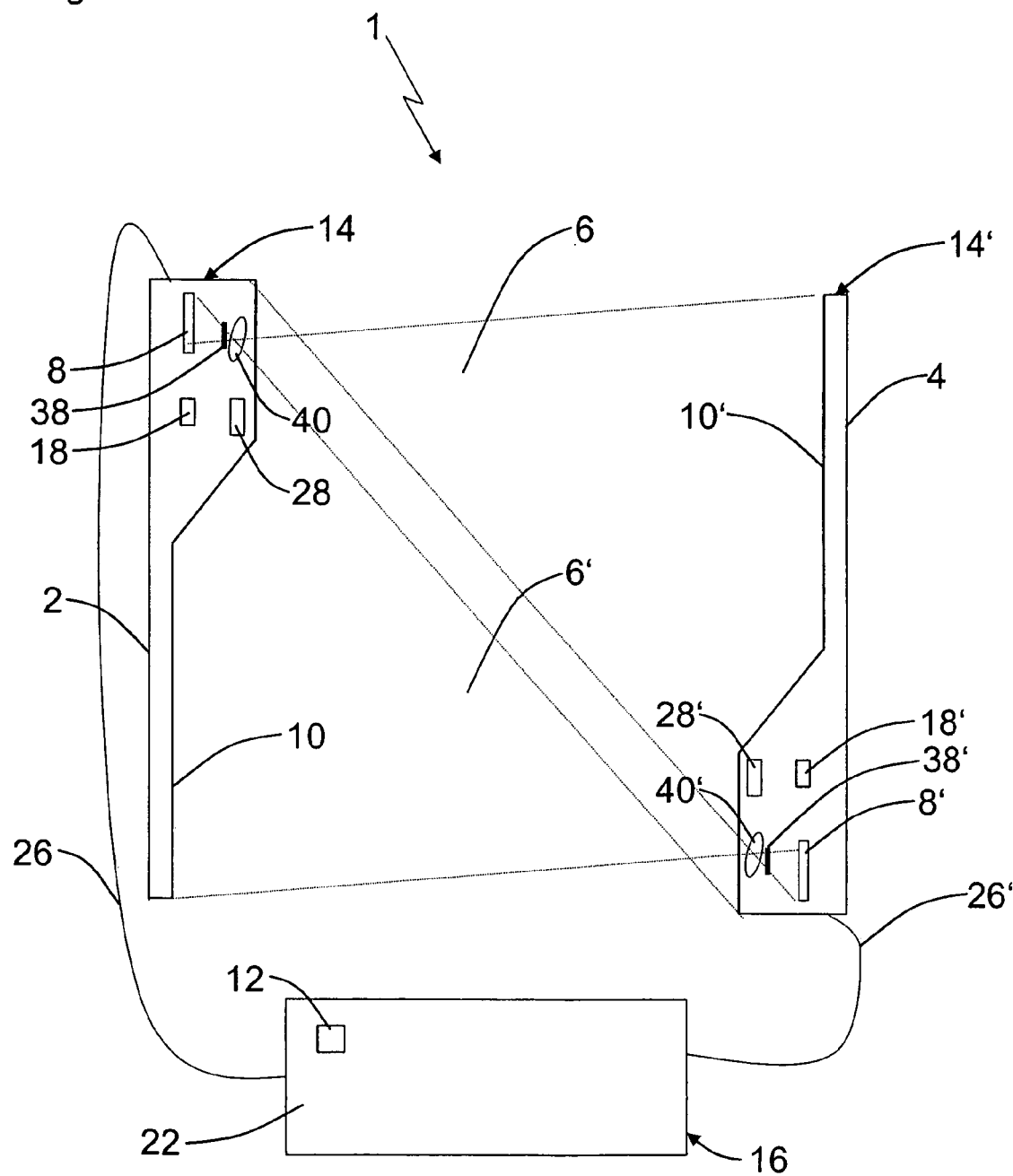
FIG. 1 schematically shows a device constructed in accordance with the present invention.

FIG. 1 shows an apparatus or a system 1 for securing a danger zone in accordance with the present invention in the form of an automatically operating machine. The system of the illustrated embodiment has a first optical unit 2 and a second optical unit 4. The optical units 2 and 4 are respectively arranged in a housing 14 and 14'. Information channels 26, 26' connect the two optical units 2, 4 with a processing and switching unit 22. The optical units 2, 4 include a picture-taking unit 8, 8', a marking 10, 10', a lighting unit 28, 28', a device 18, 18' for changing an operating parameter of the lighting unit, and a receiving optic 40, 40', respectively. In addition, the optical units 2, 4 respectively include an optical aperture 38, 38'. These optical components are arranged and aligned inside the respective housing 14, 14'. When the optical system 1 of the present invention is installed, only the optical units 2, 4 have to be aligned with respect to each other.

The two optical units 2, 4 are identical and they face each other. They are longitudinally inverted and spaced apart from each other. Optical units 2, 4 generate two protection zones or fields 6, 6'. Picture-taking units 8, 8' are arranged relative to markings 10, 10' so that the resulting protection zones 6, 6' have a triangular shape. Due to the geometric arrangement of the two optical units, the two triangular protection zones 6, 6' form a protection field that is substantially rectangular in shape.

Making the two optical units 2 and 4 identical makes it easier to install the protection system of the present invention and significantly reduces storage costs. The protected zone 6, 6' is formed between the two optical units 2, 4 by monitoring the markings 10' and 10 with the oppositely positioned picture-taking units 8 and 8'. In response to an interruption of the protected zone 6, 6', a control signal is generated, which can be used, for example, to arrest a potentially dangerous movement by a machine in the protected zone.

Figure 2:
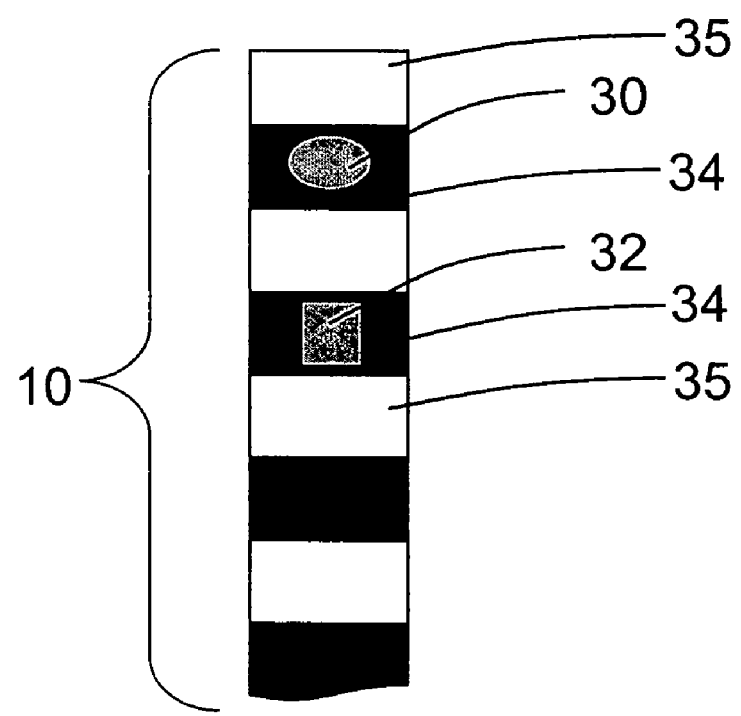
FIG. 2 schematically illustrates a marking employed by the device of the present invention.

The marking 10 on the first optical unit 2 is arranged so that it can be viewed by the picture-taking unit 8' of the second optical unit 4, and, conversely, the marking 10' of the second optical unit 4 is arranged so that it can be viewed by the picture-taking unit 8 of the first optical unit 2. Marking 10, 10' is a high-contrast but otherwise simple marking that is readily recognized by the picture-taking units 8', 8. For example, the markings 10, 10' can be alternating light fields 35 and dark fields 34, as is illustrated in FIG. 2. Lighting units 28', 28 aim their light at the oppositely located markings 10, 10' of the two optical units 2, 4. This makes it possible to efficiently illuminate markings 10, 10' according to the surrounding light conditions, so that each picture-taking unit 8', 8 can optimally take pictures of the respective markings 10, 10'.

The picture-taking units 8, 8' of the two optical units are diagonally opposite from each other. The lighting units 28, 28' are located proximate to the picture-taking units 8, 8'. The lighting unit 28 of the first optical unit 2 is arranged so that it is visible to picture-taking unit 8' of the second optical unit 4. Conversely, lighting unit 28' of the second optical unit 4 is arranged so that it is visible to the picture-taking unit 8 of the first optical unit 2. Thus, light from lighting units 28', 28 can be directed at the oppositely located picture units 8, 8' so that they can be stimulated and/or tested with light that is directly aimed at them.

For example, picture-taking units 8, 8' can be over-illuminated by subjecting them to short, successive pulses from lighting units 28', 28. This assures a maximal illumination of picture-taking units 8, 8', and with the short pulses from the lighting units 28', 28 permits the transmission of a recognition signal to the picture-taking unit. As a result of such illumination and knowledge of the light intensity within the system 1 as well as of the point in time when the illumination occurred, it is possible to test the picture-taking unit 8, 8' for satisfactory functioning. Such testing can be conducted cyclically during otherwise normal operations.

The lighting units 28, 28' has means 18, 18' for changing at least one of its operating parameters to optimize the lighting. The changing means 18, 18' can be set by the user in advance so that the operating parameters 28, 28' can be cyclically activated with the changing means 18, 18'. The operating parameter can be the light intensity. For example, the light intensity can be varied to take into account the lighting conditions of the surroundings, or light from other light sources, when illuminating markings 10', 10. It is further possible to change the light impulse duration or the time during which light pulses are inactive. This is of particular advantage for suppressing interfering light. In another advantageous embodiment, the wave length of the light is varied. This is also a way to eliminate the impact of interfering light.

During start-up, the respective markings 10, 10' can be learned and memorized by the oppositely positioned picture-taking unit 8', 8. System 1 has appropriate means for learning the markings 10, 10'. For example, markings 10, 10' can be learned with the help of appropriate start-up software by activating a simple pushbutton or making a selection from a software menu. A comparator 12 can compare the learned markings 10, 10' with an actual picture of markings 10, 10' during operation of the system, which can then be used for setting a control signal generated by the processing and switching unit 22.

Markings 10, 10' preferably have a sufficient size so that they cover the entire side of optical units 2 and 4 to generate protection zones 6, 6' that are free of dead zones. The absence of such dead zones is particularly important when space is limited, as is the case, for example, in the vicinity of material supply openings on semiconductor wafer production machines. As can be seen in FIG. 2, a picture-taking opening 30 and a light emitting opening 32 for the lighting unit can be arranged, for example, within dark fields 34 of marking 10. This leads to an optical integration of markings 10 with the picture-taking unit and the lighting unit and the associated openings 30, 32.

The markings can extend over additional modules by extending housings 14, 14' with further modules that carry the pattern of the markings. The additional modules are arranged within the field of view of the picture-taking unit, which need not be adjusted for the additional markings. The lighting unit also requires no additional adjustments for such additional markings. The housing for the optical units can be rearranged in the area of the applied markings. For example, the optically controlled, virtual barrier can subsequently be reduced in size.

The processing and switching unit 22 forms a connection between the two optical units 2 and 4. Processing and switching unit 22 is preferably arranged in its own housing 16. This has the very significant advantage that the optical units 2, 4 can be made small and produced at relatively low costs. It is preferred to arrange only one processing and switching unit 2 for the optical units 2, 4 in its own housing. To provide redundancy and enhanced operational safety for the system, the processing and switching unit 22 is preferably a dual-channel unit. By controlling both optical units 2, 4 together, the processing and switching unit 22 can be economically produced. By combining the information in the processing and switching unit, a duplication of conductors and synchronization devices can be avoided. The processing and switching unit 22 is coupled to optical elements 2, 4 via information channels 26, 26' only. Information channels 26, 28 can be information-carrying conductors, a bus system or a wireless transmission system. Information conductors are available in a variety of configurations at relatively low costs for inclusion in the system 1 of the present invention. A bus system is especially suitable for expanded functionality such as for conducting an additional diagnostic function. Wireless signal transmissions via radio or optical transmission channels are especially suited for spatially dispersed systems because they eliminate the need for laying conductors over large distances.

The processing and switching unit 22 makes it possible to jointly control and evaluate the lighting units 28, 28' and the picture-taking units 8, 8' of the two optical units 2, 4. It is an advantage provided by the present invention that changes in the operating parameters of the lighting unit 28 of the first optical unit 2 and the picture-taking unit 8' of the second optical unit 4 are made with the processing and switching unit 22. In this way, picture-taking unit 8' of the second optical element 4 can be evaluated on the basis of how the lighting unit 28 of the first optical unit 2 is controlled. This establishes a direct synchronization and coordination between lighting unit 28 of the first optical unit and picture-taking unit 8' of the second optical unit 4. Additional optical synchronization is therefore not necessary.

In an advantageous further development of the present invention, interference filters are placed in front of the picture-taking unit of the optical units. The interference filter reduces the impact of outside light. In addition, losses of sharpness or focus for multi-color representations is reduced, which reduces the cost of the receiving optics.

A receiving optic 40, 40' is provided for the clear, sharp reproduction of markings 10', 10 on picture-taking units 8, 8'. With the help of receiving optics 40, 40', it is possible to also capture an area which surrounds markings 10', 10 so that markings 10', 10 of different lengths or different orientations can be fully viewed by the picture-taking units 8, 8'.

Optical units 2, 4 further include a diaphragm or aperture stop 38, 38' at the focal point of receiving optics 40, 40'. The picture-taking unit 8, 8' is located approximately 0.5 mm to 2 mm behind aperture 38, 38'. The aperture 38, 38' improves the depth resolution and suppresses indirect radiation or light outside the intended light receiving angle. Aperture 38, 38' is preferably made of metal to shield picture-taking unit 8, 8' from receiving undesirable electromagnetic radiation via receiving optics 40, 40'.

What is claimed is:

1. Apparatus for monitoring a dangerous zone with an optical system for monitoring a protected field comprising at least two opposing optical units arranged so that the protected field is between them, each optical unit including a picture-taking unit, a processing and switching unit operatively connected with the picture-taking unit for generating a danger signal, and a marking associated with each optical unit, each picture-taking unit being arranged so that the marking on an opposite side of the protected field associated with the optical unit of the other picture-taking unit can be viewed by the first-named picture-taking unit, the processing and switching unit including a comparison unit for comparing a picture taken by a picture-taking unit with a reference picture, each optical unit further including at least one lighting unit for illuminating the oppositely positioned marking associated with the oppositely positioned optical unit, the picture-taking unit, the markings and the lighting units of each optical unit being arranged mutually aligned in or on a common housing,
wherein the first and second optical units are identical and are arranged longitudinally reversed, opposite and spaced apart from each other, and wherein the lighting units of the first and second optical units are arranged so that they are within the view of the second and first picture-taking units, respectively, and wherein the picture-taking units of the first and second optical units can be subjected to light from the second and first lighting units, respectively, above and/or below a picture-taking threshold illumination of the respective picture-taking units.

2. Apparatus according to claim 1 including means for learning the markings.

3. Apparatus according to claim 1 including means for changing at least one operating parameter of the lighting units.

4. Apparatus according to claim 3 wherein the means for changing the at least one operating parameter is adapted to be cyclically activated.

5. Apparatus according to claim 3 wherein the at least one operating parameter of the lighting unit comprises at least one of a light intensity, a light impulse duration, a light impulse interruption duration, and a light wave length.

6. Apparatus according to claim 1 wherein the processing and searching unit is arranged in an additional housing.

7. Apparatus according to claim 1 including information channels operatively connecting the optical units with the processing and switching unit.

8. Apparatus according to claim 7 wherein the information channel comprises one of an information conductor, a bus system and a wireless transmission system.

9. Apparatus according to claim 1 wherein the markings are applied to and extend over an entire side of the housing.

10. Apparatus according to claim 9 wherein the markings comprise modules attached to the housing.

11. Apparatus according to claim 10 wherein the housing is longitudinally adjustable for adapting the housing to the markings.

12. Apparatus according to claim 1 wherein the markings comprise at least two different areas.

13. Apparatus according to claim 12 wherein the areas comprise relatively light and relatively dark areas.

14. Apparatus according to claim 13 wherein the picture-taking unit and the lighting unit each contain an opening arranged within at least one of the relatively dark areas of the markings.

15. Apparatus according to claim 1 wherein the picture-taking units of the optical units include picture-taking surfaces of like dimensions for taking pictures of the markings having at least one of different sizes, different picture positions and different picture orientations.

16. Apparatus according to claim 1 wherein at least one of the optical units includes an interference filter.

17. Apparatus according to claim 1 wherein the optical units each include a receiving optics for forming a picture of elongated, narrow markings.

18. Apparatus according to claim 17 wherein the aperture is constructed of a metallic material for increasing an electromagnetic tolerance of the optical units.

19. Apparatus according to claim 1 wherein the optical units each include an aperture for improving a field of depth.

20. Apparatus according to claim 19 wherein the picture-taking unit is arranged at a distance of about 0.5-2 mm behind the aperture.

* * * * *